Oct. 27, 1936.    C. H. DRUDE    2,058,575
CLUTCH DISK
Filed Jan. 15, 1932
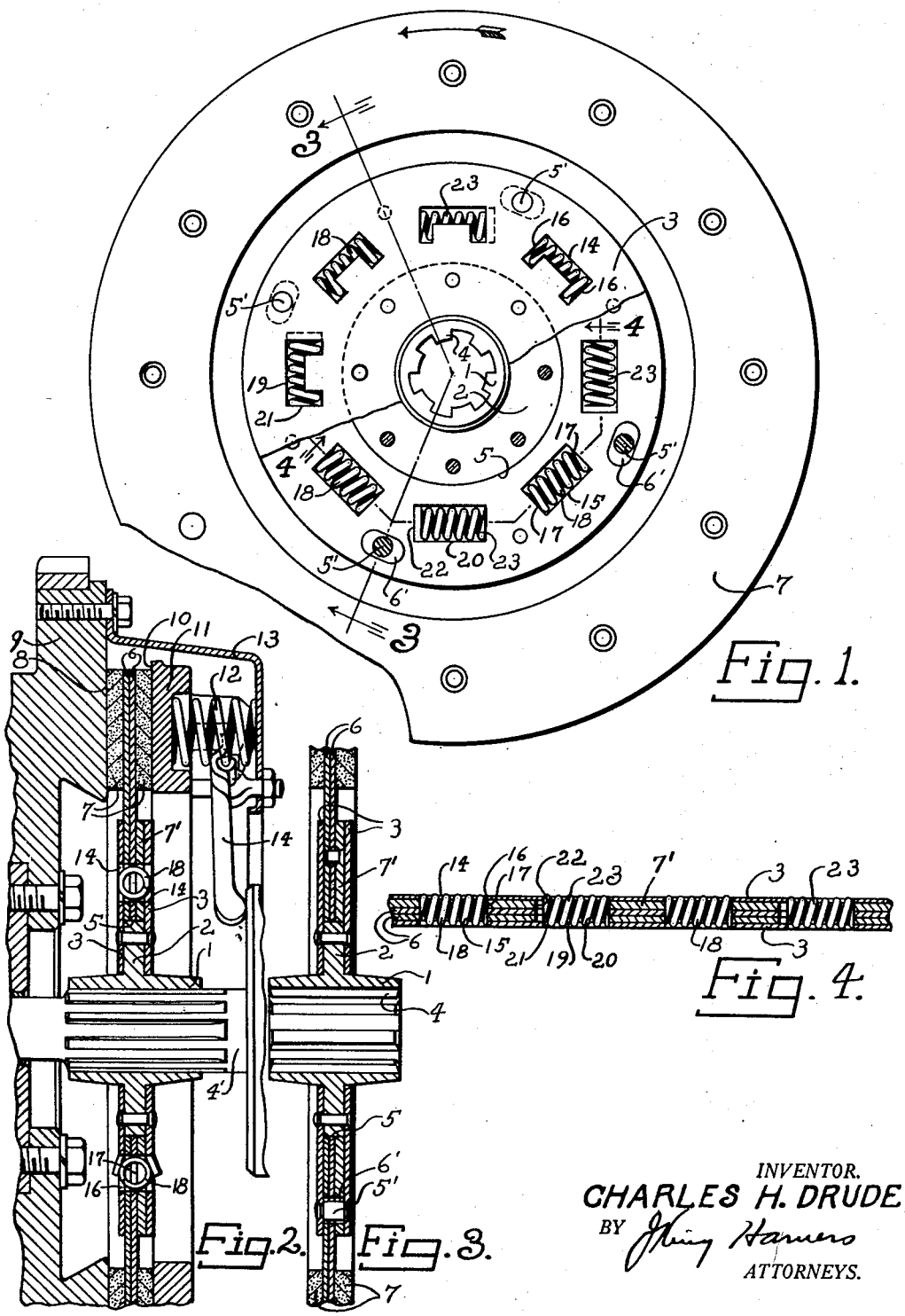
INVENTOR.
CHARLES H. DRUDE
BY
ATTORNEYS.

Patented Oct. 27, 1936

2,058,575

UNITED STATES PATENT OFFICE 2,058,575

CLUTCH DISK

Charles H. Drude, Ferndale, Mich., assignor to Chrysler Corporation, Detroit, Mich., a corporation of Delaware Application January 15, 1932, Serial No. 586,828

13 Claims. (Cl. 192—68)

This invention relates to improved clutch disks.

Heretofore clutch disks, particularly of the type used in motor vehicles, have included relatively rotatable inner and outer portions, the inner portion being non-rotatably securable to a shaft and the outer portion having friction lining thereon for engagement with a driving member. These parts of the disk have been yieldably held against relative rotation by springs or other resilient means so as to absorb the shock exerted on the clutch disk during engagement of the clutch.

Resilient means of this character are required to oppose relative rotation of the parts of a clutch disk with substantial rigidity when a vehicle is being driven by its engine, as for example, during acceleration. When a vehicle is decelerating with the clutch engaged, only the force required to drive the engine is transmitted through the clutch disk, and therefore much less rigidity is required of the resilient means which oppose relative rotation of the inner and outer parts of the clutch disk.

The main objects of the invention are to provide an improved clutch disk of the type which has inner and outer parts that are yieldably held against relative rotation by resilient means which offer sufficient opposition to relative rotation of the parts during acceleration of a vehicle and which oppose relative rotation of the parts with much less rigidity when the engine is driven by the momentum of the vehicle during deceleration thereof; to provide means of this kind which produces the softness required in opposing relative rotation of the disk parts during deceleration so as to eliminate transmission rattle; to provide resilient members for this purpose which are substantially identical in their dimensions and characteristics; to provide an assembly of substantially identical resilient members in which all of the members are operative during rotation of the outer part of the clutch disk in one direction relative to the inner structure thereof and in which some of the resilient members are inoperative during rotation of the outer part in the opposite direction relative to the inner structure; and to provide a clutch disk in the clutch mechanism of a vehicle which has relatively rotatable inner and outer parts that rotate relative to each other more freely during deceleration than during acceleration of the vehicle.

An illustrative embodiment of the invention is shown in the accompanying drawing, in which:

Fig. 1 is a side elevation of my improved clutch disk showing portions thereof removed to disclose the underlying structure.

Fig. 2 is a fragmentary vertical section of a vehicle clutch which is equipped with my improved clutch disk.

Fig. 3 is a transverse section taken on the line 3—3 of Fig. 1.

Fig. 4 is a transverse section taken on the line 4—4 of Fig. 1.

In the form shown, my improved clutch disk has an inner hub portion which includes a splined collar 1 having a radially extending flange 2 on the respectively opposite sides of which are fixed spaced disk-shaped plates 3. The inner periphery of the collar 1 is provided with splines 4 for non-rotatably fixing the disk on a driven shaft 4'. Journaled on the periphery 5 of the flange 2 is an outer part of the clutch disk which rotates relative to the inner part thereof and which includes a pair of adjacent disk-shaped plates 6 having their inner portions disposed between the plates 3 of the hub portion. In the illustration shown in Fig. 3, the space between the plates 3 is somewhat wider than the combined thicknesses of the plates 6, and in order to fill in the excess space, a disk shaped plate 7' is secured by rivets or other suitable means to one of the plates 6. This filler plate may or may not be used, depending on the space between the plates 3 and the thickness of the plates 6. Relative rotation of the inner and outer parts of the clutch disk is positively limited by pins 5' which have end portions fixed in apertures in the plates 3 and which extend through elongated slots 6' in the plates 6.

Clutch lining rings 7 are fixed to the non-adjacent sides of the plates 6 in any suitable manner. These clutch lining rings are disposed between a side face 8 of a flywheel 9 and a side face 10 of a pressure ring 11 which is normally urged toward the flywheel 9 by coil springs 12 that bear between the pressure ring and a housing 13 that is carried by the flywheel. The springs 12 normally hold the pressure ring 11 and flywheel 9 in frictional engagement with the clutch lining rings 7, thereby forming a driving connection between the flywheel and the clutch disk, which in turn drives the shaft 4'. The clutch is provided with releasing apparatus that includes pivotally mounted fingers 14 which, when rotated in a clockwise direction, as viewed in Fig. 2, move the pressure ring 11 to the right against the action of the springs 12 to disengage the clutch.

The inner and outer parts of the clutch disk are yieldably held against relative rotation by a plurality of resilient members, such as coil springs, which are seated in registering slots formed in the overlapped portions of the plates 3 and 6 of the inner and outer parts. The registering slots 14 and 15 in the plates 3 and 6, respectively, are all equal in length and their opposite ends constitute opposed faces 16 and 17 against which the extremities of coil springs 18 bear. The slots 14 and 15 of every other pair of registering slots in the circumferentially arranged series, shown in Fig. 1, are of equal length and therefore the springs 18 in these slots oppose relative rotation of the outer member in both directions with respect to the inner member. The pairs of registering slots 19 and 20 in the plates 3 and 6, respectively, located between the pairs of registering slots 14 and 15, are of unequal length, the slots 20 in the plates 6 being longer than the slots 19 in the plates 3. The corresponding ends 21 and 22 of the slots 19 and 20, respectively, and the opposite end of the slot 19 provide opposed faces against which the extremities of coil springs 23 bear. The right extremity of the coil springs 23, shown in Fig. 4, bears against the corresponding ends 21 and 22 of the slots 19 and 20, and the left extremity of these springs bears only against the opposite extremities of the slots 19. With this construction, rotation of the outer part of the clutch disk in a counter-clockwise direction relative to the inner part of the disk is yieldably opposed by all of the springs 18 and 23, and clockwise rotation of the outer part of the disk is opposed only by the coil springs 18. The clearance between the left end of the openings 20 in the plates 6 and the left extremity of the springs 23 renders these springs ineffective in opposing clockwise rotation of the outer part of the disk with respect to the inner portion thereof.

The opposing forces of all eight springs, shown in Fig. 1, are applied in resisting rotation of the outer portion of the clutch disk with respect to the inner portion thereof during driving of the shaft 4' or driven member by the flywheel 9 or driving member when the vehicle is propelled by its engine, and only four of the springs oppose relative rotation of the outer part of the clutch disk when the flywheel is being driven by the momentum of the vehicle during deceleration. The opposition to relative rotation of the parts of the clutch disk offered by four springs which are operative during deceleration of the vehicle is sufficiently soft or yieldable to eliminate the transmission noise, particularly known as transmission rattle, and the combined effect of all eight springs in opposing relative rotation of the inner and outer parts of the clutch disk provides sufficient rigidity for acceleration. Any desired number of coil springs may be employed and any part of the entire number used may be conditioned in the above manner to become inoperative during deceleration of the vehicle.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. A clutch disk including an inner hub portion and a relatively rotatable outer portion having a friction element thereon, and a plurality of resilient elements cooperating with said inner and outer portions for opposing relative rotation of the latter, said resilient elements being so constructed and arranged that all thereof oppose rotation of said outer portion relative to said inner portion in one direction, and less than all of said elements oppose rotation of said outer portion relative to said inner portion in an opposite direction.

2. In clutch mechanism including normal driving and driven elements, a clutch disk having an inner hub portion mounted on one of said elements and a relatively rotatable outer portion including friction means for co-operating with the other element, and a plurality of resilient members all bearing between said inner and outer portions during only normal driving of said driven element by said driving element, certain of said resilient members being ineffective during driving of said normal driving element by said normal driven element.

3. In clutch mechanism including normal driving and driven elements, a clutch disk having an inner hub portion mounted on said driven element and a relatively rotatable outer portion including friction means for co-operating with said driving element, a plurality of spring members bearing between the inner and outer portions of said disk for opposing rotation of said outer portion relative to said inner portion during normal driving of said driven element by said driving element, at least one of said springs being ineffective in opposing relative rotation of said inner and outer portions during driving of said normal driving element by said normal driven element.

4. A clutch disk including an inner hub portion and a relatively rotatable outer portion, pairs of substantially equally spaced opposed faces on said inner and outer portions respectively, a resilient member disposed between said faces yieldably opposing relative rotation of said outer portion in both directions relative to said inner hub portion, pairs of unequally spaced opposed faces on said inner and outer portions respectively, and a resilient member between said unequally spaced pairs of opposed faces for augmenting the opposition to rotation of said outer portion with respect to said inner portion in only one direction.

5. A clutch disk including an inner hub part and a relatively rotatable outer part having overlapping portions provided with registering slots of substantially equal lengths and having other registering slots of unequal lengths, resilient elements in said registering slots of equal lengths bearing between the extremities thereof for yieldably opposing rotation of said outer part with respect to said inner part in both directions, and resilient elements in said registering slots of unequal lengths bearing between corresponding extremities of said slots at one end thereof and the other extremity of only one of said slots for resiliently opposing rotation of said outer part relative to said inner part in only one direction.

6. In a vehicle clutch mechanism including normal driving and driven elements, a clutch disk having an inner hub part and a relatively rotatable outer part including overlapping portions provided with registering slots of substantially equal lengths and having registering slots of unequal lengths, springs disposed in said registering slots of equal lengths bearing between the corresponding ends thereof for yieldably opposing rotation of said outer part and normal driving element relative to said inner part and normal driven element during normal driving of said driven element and when the latter drives the normal driving element during deceleration of the vehicle, and springs disposed in said registering slots of unequal lengths bearing at one end upon the corresponding extremities of said unequal slots and at their other ends upon an extremity of only one slot for yieldably opposing rotation of said outer part and driving element relative to said inner part and driven element only during normal driving of the latter by said normal driving element.

7. In a clutch member, an inner hub part including a pair of spaced plates having a plurality of slots therein, an outer plate rotatable relative to said hub plates having one series of slots substantially equal in length to and registering with some of the slots of said hub plates and having slots registering with and exceeding the length of the other slots of said hub plates, springs in the registering equal length slots of said hub and outer slots for opposing rotation of said outer plate relative to said hub part in both directions, springs in the registering unequal length slots of said hub and outer plates bearing at one end upon the corresponding extremities of said unequal length slots and at the other end upon only the extremities of the slots in said inner hub plates for opposing rotation of said outer plate in only one direction relative to said hub plates, and clutch lining material on said outer plate.

8. In a clutch member, an inner hub part including a pair of spaced plates having a plurality of slots therein, an outer plate rotatable relative to said hub plates having one series of slots substantially equal in length to and registering with some of the slots of said hub plates and having slots registering with and exceeding the length of the other slots of said hub plates, pins fixed at their ends on said spaced hub plates extending through elongated slots in said outer plate for positively limiting rotation of the latter with respect to said hub part, and springs in the equal length registering slots of said hub and outer plates and in said registering unequal length slots of said hub and outer plates adapted to yieldably oppose rotation of said outer plate in one direction relative to said hub part with greater force than that opposing rotation of said outer plate in the opposite direction.

9. In clutch mechanism including normal driving and driven elements, a clutch disk having an inner hub portion mounted on one of said elements and a relatively rotatable outer portion including means for cooperating with the other element to establish a disengageable driving connection between said elements, and a plurality of resilient members all bearing between said inner and outer portions during only normal driving of said driven element by said driving element, certain of said resilient members being ineffective during driving of said normal driving element by said normal driven element.

10. A power transmitting device including relatively rotatable normal driven and driving members, and means including abutments on said driving and driven members and resilient elements cooperating with said abutments for establishing a yieldable driving connection therebetween, said means being so constructed and arranged that some of said resilient elements are operative in driving either one of said members by the other and other resilient elements are operative only during driving of said normal driven member by said normal driving member.

11. A power transmitting device including relatively rotatable members, and means including abutments on said members and resilient elements cooperating with said abutments for establishing a yielding driving connection therebetween, said means being so constructed and arranged that some of said resilient elements are operative in driving either one of said members by the other and at least one resilient element is operative only during driving of a predetermined one of said members by the other.

12. A clutch disk including an inner hub portion and a relatively rotatable outer portion, and means including abutments on said inner and outer portions and a plurality of resilient elements cooperating with said abutments for establishing a driving connection therebetween, said means being so constructed and arranged that some of said resilient elements are operative in driving either one of said portions by the other and some of said resilient means are operative only during driving of a predetermined one of said portions by the other portion.

13. In a vehicle drive, an engine drive shaft, a shaft driven by said drive shaft and adapted to drive the vehicle, and means providing a drive from the driven shaft to the drive shaft when the vehicle tends to drive the engine, said drive means including a plurality of springs spaced circumferentially about the axis of said shaft, said springs being adapted to yieldingly transmit said drive to the drive shaft with a greater degree of yieldability than that existent when said drive shaft drives said driven shaft.

CHARLES H. DRUDE.